United States Patent
Cho et al.

(10) Patent No.: US 9,646,489 B2
(45) Date of Patent: May 9, 2017

(54) REMOTE CONTROL METHOD AND APPARATUS FOR HOME APPLIANCES

(71) Applicant: Samsung Electronics Co., Ltd., Suwon-si, Gyeonggi-do (KR)

(72) Inventors: Chi Hong Cho, Suwon-si (KR); Dong Keon Kong, Suwon-si (KR); Se Hoon Kim, Seoul (KR); Joon Ho Park, Seongnam-si (KR); Eun Hui Bae, Seoul (KR); Hyoung Kyu Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 14/323,416

(22) Filed: Jul. 3, 2014

(65) Prior Publication Data

US 2015/0009022 A1 Jan. 8, 2015

(30) Foreign Application Priority Data

Jul. 4, 2013 (KR) .................. 10-2013-0078208

(51) Int. Cl.
*H05B 37/02* (2006.01)
*G05F 1/00* (2006.01)
(Continued)

(52) U.S. Cl.
CPC ......... *G08C 17/02* (2013.01); *G06K 7/10168* (2013.01); *G06K 7/10405* (2013.01);
(Continued)

(58) Field of Classification Search
CPC    G08C 17/02; G08C 2201/40; G08C 2201/93; G08C 2201/92; G08C 17/00; G08C 19/00; G08C 2201/30; G08C 2201/70; G08C 2201/91; G08C 23/04; G08C 2201/20; G08C 2201/32; G08C 2201/42; G08C 2201/61; G08C 2201/10; G05B 15/02; H04B 5/0031; H04B 5/0062; H04L 12/2803; H04L 12/281;
(Continued)

(56) References Cited

U.S. PATENT DOCUMENTS

| | | | |
|---|---|---|---|
| 6,278,976 B1 * | 8/2001 | Kochian ............... | H04M 1/656 379/101.01 |
| 8,009,042 B2 * | 8/2011 | Steiner ............... | H05B 37/0227 315/159 |

(Continued)

*Primary Examiner* — Dionne H Pendleton
(74) *Attorney, Agent, or Firm* — Jefferson IP Law, LLP

(57) ABSTRACT

A remote control method and an apparatus for home appliances, wherein a remote controller performs situation recognition using sensors and automatically controls home appliances without a control message from a portable device when communication with the portable device is not possible, are provided. The remote control method is designed for a remote controller managing home appliances installed in a home. The remote control method includes receiving a remote control request from a portable device capable of remotely controlling one or more home appliances, performing, upon reception of the remote control request, situation recognition with respect to the home appliances, and controlling operations of the home appliances based on situation recognition results.

16 Claims, 4 Drawing Sheets

(51) Int. Cl.
| | | |
|---|---|---|
| *G08B 13/00* | (2006.01) | |
| *G08C 17/02* | (2006.01) | |
| *H05B 33/08* | (2006.01) | |
| *G06K 19/07* | (2006.01) | |
| *G06K 7/10* | (2006.01) | |
| *G06K 9/62* | (2006.01) | |

(52) U.S. Cl.
CPC ....... *G06K 9/6253* (2013.01); *G06K 19/0717* (2013.01); *H05B 33/0854* (2013.01); *H05B 37/0236* (2013.01); *G08C 2201/40* (2013.01); *G08C 2201/93* (2013.01); *H05B 37/0218* (2013.01); *Y02B 20/48* (2013.01)

(58) Field of Classification Search
CPC ............... H04L 12/2816; H04L 12/282; H04L 12/2838; H04L 2012/2841; H04L 2012/2849; H04L 67/148; H04L 67/34; B66F 9/07581; G05D 1/0016; G05D 1/0033; G05D 2201/0216; G06F 3/04847; G06F 3/04; G06F 3/041; H04M 1/72533; H04M 15/00; H04M 1/656; H04M 2201/16; H04M 2242/14; H04M 2242/30; H04M 3/487; H04N 2005/4428; H04N 21/41407; H04N 21/42201; H04N 21/42208; H04N 21/42222; H04N 21/42224; H04N 21/42225; H04N 21/4415; H04N 2005/4408; H04N 21/4126; H04N 21/4432; H04N 21/4882; H04N 5/4403; H04W 76/02; H04W 4/02; H04W 12/02; H04W 12/06; H04W 4/008; H04W 4/04; H04W 64/00; H05B 37/0272; H05B 33/0854; H05B 37/0218; H05B 37/0227; H05B 37/0254; Y02B 20/48; B60R 2025/1013; B60R 2325/304; B60R 25/257; B60R 25/33; B60W 2550/402; G06K 7/10168; G06K 7/10405; G06K 9/6253; G06K 19/0717
USPC ............ 340/2.26, 4.3, 4.31, 4.34, 6.11, 7.23, 340/7.25, 13.22, 286.05, 12.29, 12.53
See application file for complete search history.

(56) References Cited

U.S. PATENT DOCUMENTS

| | | | |
|---|---|---|---|
| 8,729,833 B2* | 5/2014 | Chemel | H05B 33/0854 315/308 |
| 2005/0094610 A1* | 5/2005 | de Clerq | G05B 15/02 370/338 |
| 2005/0191999 A1* | 9/2005 | Tezuka | G08C 17/02 455/420 |
| 2013/0214935 A1* | 8/2013 | Kim | G08C 17/02 340/870.02 |
| 2015/0017913 A1* | 1/2015 | Kuroyama | G08C 17/00 455/41.1 |

\* cited by examiner

REMOTE CONTROL METHOD AND APPARATUS FOR HOME APPLIANCES

CROSS-REFERENCE TO RELATED APPLICATION(S)

This application claims the benefit under 35 U.S.C. §119(a) of a Korean patent application filed on Jul. 4, 2013 in the Korean Intellectual Property Office and assigned Serial number 10-2013-0078208, the entire disclosure of which is hereby incorporated by reference.

TECHNICAL FIELD

The present disclosure relates to a remote control method and an apparatus for home appliances. More particularly, the present disclosure relates to a remote control method and an apparatus for home appliances wherein a remote controller performs situation recognition using sensors and automatically controls home appliances without a control message from a portable device when communication with the portable device is not possible.

BACKGROUND

Modern portable devices have evolved into multimedia players supporting composite functions, such as capture of images or moving images, playback of music files or video files, gaming, broadcast reception, wireless Internet access, and the like. Hardware and software features are continuously developed to enhance portability and convenience of portable devices while satisfying user needs.

Such a portable device may be used for remote control of home appliances. To remotely control home appliances, the portable device may receive state information on the home appliances from a server and sends a command for controlling states of the home appliances to the server.

In a typical remote control scheme for home appliances, to control the state of a particular home appliance, the user has to enter a control command to the portable device. Hence, when the portable device is unable to communicate with the server or an error occurs in the remote control environment, the user is unable to remotely control the home appliance.

In the case of a failure of communication between the portable device and the server after a heating device, such as a heater or a gas range is turned on, it may be unable to remotely turn off the heating device in a suitable time.

Therefore, a need exists for a remote control method and an apparatus for home appliances wherein a remote controller performs situation recognition using sensors and automatically controls home appliances without a control message from a portable device when communication with the portable device is not possible.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus that remotely controls home appliances according to situation recognition.

Another aspect of the present disclosure is to provide a remote control method and an apparatus that can directly control home appliances according to situation recognition results even when a portable device cannot be used to control the home appliances owing to communication failure.

In accordance with an aspect of the present disclosure, a remote control method for a remote controller managing home appliances installed in a home is provided. The remote control method includes receiving a remote control request from a portable device capable of remotely controlling one or more home appliances, performing, upon reception of the remote control request, situation recognition with respect to the home appliances, and controlling operations of the home appliances based on situation recognition results.

The performing of situation recognition may include monitoring at least one of operational states of the home appliances and the surroundings of the remote controller.

The performing of situation recognition may include performing situation recognition based on information collected through at least one of a camera sensor, a gas sensor, a temperature sensor, a humidity sensor, and a motion sensor.

The controlling of the operations of the home appliances includes determining whether data communication with the portable device is possible, and controlling, when data communication with the portable device is not possible, operations of the home appliances based on situation recognition results.

The determining of whether the data communication is possible includes sending a message to the portable device, and determining that data communication with the portable device is not possible when a response corresponding to the message is not received.

The determining of whether the data communication is possible may include determining that data communication with the portable device is not possible when no message is received from the portable device for a preset time.

The remote control method may further include sending the situation recognition results to the portable device.

The remote control method further includes receiving a control message for controlling the home appliances from the portable device, and controlling operations of the home appliances according to the received control message.

In accordance with another aspect of the present disclosure, a remote controller for home appliances installed in a home is provided. The remote controller includes a communication unit configured to communicate data with the home appliances and with a portable device capable of remotely controlling the home appliances, a sensor unit configured to collect state information of the home appliances, and a control unit configured to conduct a process of, when a remote control request is received through the communication unit from the portable device, situation recognition with respect to the home appliances based on information collected through the sensor unit, and to control operations of the home appliances according to situation recognition results.

The control unit is aware of at least one of operational states of the home appliances and the surroundings of the remote controller based on information collected through the sensor unit.

The sensor unit may include at least one of a camera sensor, a gas sensor, a temperature sensor, a humidity sensor, and a motion sensor.

The control unit may determine whether data communication with the portable device is possible through the communication unit, and control, when data communication with the portable device is not possible, operations of the home appliances based on situation recognition results.

The control unit may control the communication unit to send a message to the portable device, and determine that data communication with the portable device is not possible when a response corresponding to the message is not received.

The control unit may determine that data communication with the portable device is not possible when no message is received from the portable device for a preset time.

The control unit may control the communication unit to send the situation recognition results to the portable device.

When a control message for controlling the home appliances is received through the communication unit from the portable device, the control unit may control operations of the home appliances according to the received control message.

In a feature of the present disclosure, when home appliances are not directly controlled by a portable device, the remote control apparatus may control states of the home appliances by recognizing nearby surroundings or monitoring states of the home appliances.

Even when a portable device is unable to communicate with home appliances or the user cannot directly control the home appliances, the remote control apparatus and method can automatically control states of the home appliances, ensuring safety in remote control.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

It will be further understood that the terms "comprising", "including", "having" and variants thereof, when used in this specification, specify the presence of stated features, operations, elements, and/or components, but do not preclude the presence or addition of one or more other features, operations, elements, components, and/or groups thereof.

Embodiments of the present disclosure may be applied to a remote controller that enables a portable device to remotely control home appliances.

The remote controller may be implemented as a terminal, a tablet computer, a robot, a server, and the like, and may be movably installed or immovably installed (e.g., attached to a wall in the household).

Figure 1:
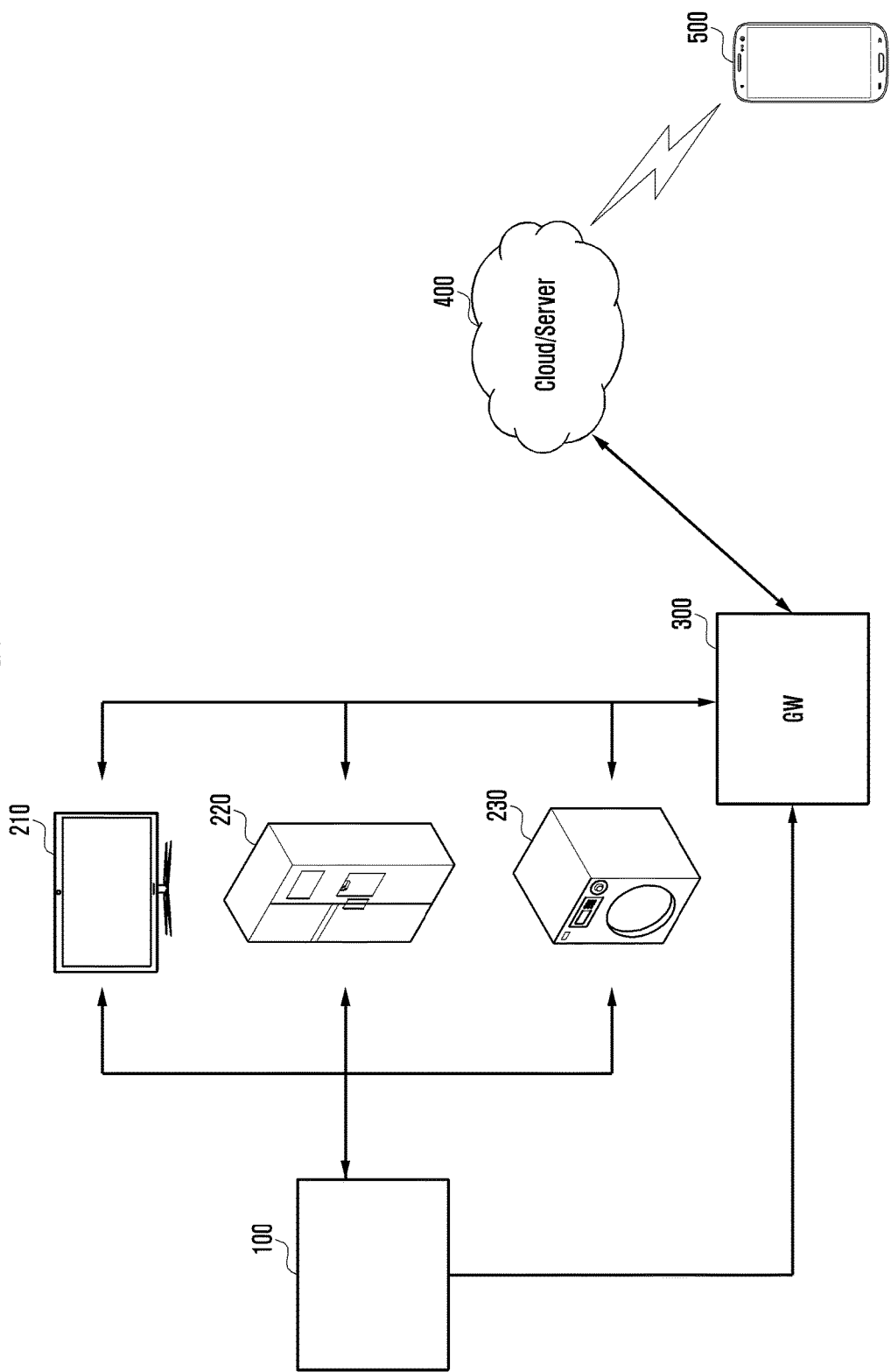
FIG. 1 illustrates an architecture of a network on which a remote controller operates according to an embodiment of the present disclosure.

FIG. 1 illustrates an architecture of a network on which a remote controller operates according to an embodiment of the present disclosure.

Referring to FIG. 1, as a remote control apparatus, a remote controller 100 operates on a network and communicates data with one or more home appliances 210, 220, and 230 and a gateway 300. The remote controller 100 may communicate data with the home appliances 210, 220, and 230 in a wired or wireless manner to control the home appliances 210, 220, and 230.

Upon reception of a remote control request from a portable device 500, the remote controller 100 may control the home appliances 210, 220, and 230. Here, the remote controller 100 may control the home appliances 210, 220, and 230 according to a control message received from the portable device 500.

In various embodiments of the present disclosure, the portable device 500 may be one of regular portable devices, such as a smartphone, a portable terminal, a mobile terminal, a Personal Digital Assistant (PDA), a Portable Multimedia Player (PMP), a notepad, a WiBro terminal, a tablet computer, and the like, or be any device supporting remote control of home appliances.

In various embodiments of the present disclosure, when communication with the portable device 500 is not possible, the remote controller 100 may perform situation recognition and directly control the home appliances 210, 220, and 230 according to the situation recognition results.

The portable device 500 may directly communicate with the home appliances 210, 220, and 230 without intervention of the remote controller 100 to control the home appliances 210, 220, and 230. Here, the portable device 500 may control the home appliances 210, 220, and 230 through a cloud/server 400 providing remote control services for household appliances.

The gateway 300 on the network may interconnect the remote controller 100, the home appliances 210, 220, and 230, and the cloud/server 400.

Figure 2:
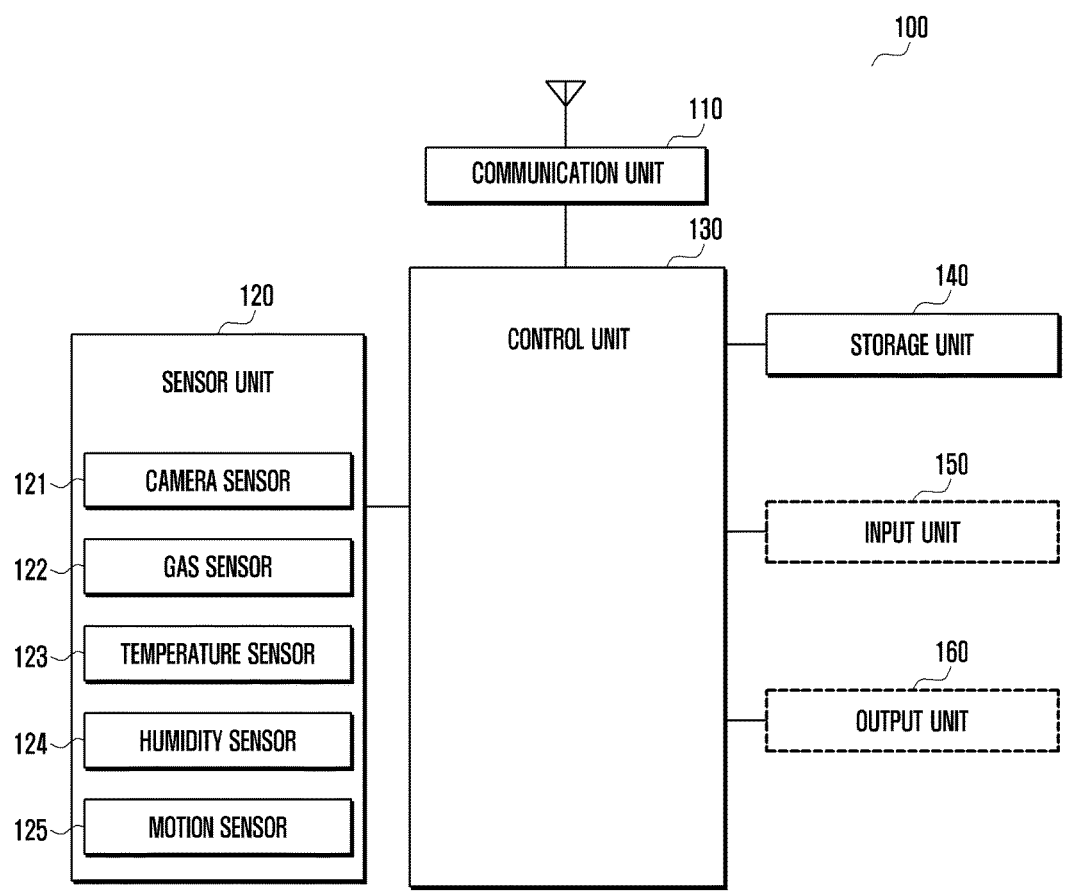
FIG. 2 is a block diagram of a remote controller according to an embodiment of the present disclosure.

FIG. 2 is a block diagram of a remote controller according to an embodiment of the present disclosure.

Referring to FIG. 2, the remote controller 100 may include a communication unit 110, a sensor unit 120, a control unit 130, and a storage unit 140.

The communication unit 110 may include one or more communication modules to enable wired and/or wireless communication between the remote controller 100 and one or more home appliances, and between the remote controller 100 and the portable device. More specifically, the communication unit 110 may communicate with external entities by use of communication schemes, such as Wireless Local Area Network (WLAN), Wi-Fi, Wireless Broadband (WiBro), Worldwide Interoperability for Microwave Access (Wi-MAX), and High Speed Downlink Packet Access (HSDPA).

The communication unit 110 may send and receive radio signals to and from at least one of a base station, a portable device, a server on a mobile communication network. The radio signals may carry various types of data in relation to a voice call, a video call, and a text or multimedia message. More particularly, the communication unit 110 may receive Global Positioning System (GPS) signals from GPS satellites.

In various embodiments of the present disclosure, the communication unit 110 may send a control message to a home appliance and receive a message containing status information from the home appliance under control of the control unit 130.

The sensor unit 120 may include a plurality of sensors to monitor nearby surroundings of the remote controller 100 and to detect states of the home appliances. The sensor unit 120 may generate a detecting signal corresponding to a detected state and send the detecting signal to the control unit 130. For example, the sensor unit 120 may include a camera sensor 121, a gas sensor 122, a temperature sensor 123, a humidity sensor 124, and a motion sensor 125.

The camera sensor 121 may capture an image of a target object and send a data signal corresponding to the image to the control unit 130. More particularly, the camera sensor 121 may capture an image of a home appliance and send the captured image to the control unit 130. The control unit 130 may recognize the surroundings or determine the status of the home appliance through analysis of captured images. For example, when a person appears in a captured image, the control unit 130 may recognize that a person is present in the house in which the remote controller 100 is installed. When colors or images are detected in the TV frame of a camera-captured image, the control unit 130 may recognize that the TV set is turned on.

The gas sensor 122 detects specific chemical substances in the surrounding air and sends an electrical signal corresponding to the concentration of the detected chemical substances to the control unit 130. The gas sensor 122 may detect gaseous substances by use of various schemes based on changes in physical properties due to gaseous adsorption or reaction, combustion heat, electrochemical reactions, and physical characteristic values according to types of gases to be detected.

More particularly, the gas sensor 122 may detect a fire outbreak in the house by detecting carbon dioxide in the surrounding air.

The temperature sensor 123 detects temperature of the air or water in the vicinity or detects temperature of the wall at which the remote controller 100 is installed. The temperature sensor 123 may send an electrical signal corresponding to the detected temperature to the control unit 130. The temperature sensor 123 may use a thermistor, platinum, nickel or a thermocouple as a detecting element.

The humidity sensor 124 may detect the amount of moisture in the surrounding air and send an electrical signal corresponding to the detected moisture amount to the control unit 130. The humidity sensor 124 may include a resistive or capacitive humidity sensor manufactured by a semiconductor process.

The motion sensor 125 detects motion of the remote controller 100. For example, the motion sensor 125 may measure the rotation angle of the remote controller 100 with respect to three dimensional reference axes.

In the above description, several sensors usable in the sensor unit 120 are described. However, the present disclosure is not limited thereto. Any sensor capable of monitoring the surroundings of the remote controller 100 or detecting the status of one home appliance may be included in the sensor unit 120.

The control unit 130 may control the individual components and overall operation of the remote controller 100. For example, the control unit 130 may be aware of the situation based on information collected through the sensor unit 120 and control the individual components so that at least one home appliance is controlled.

Control operations of the control unit 130 are described below with reference to the drawings.

The storage unit 140 may be used to store programs and instructions for the remote controller 100. The control unit 130 may execute programs or instructions stored in the storage unit 140.

The storage unit 140 may include one or more of various types of storage media, such as a flash memory, a hard disk, a multimedia or other memory card (i.e., micro Secure Digital (SD) or extreme Digital (XD)), a Random Access Memory (RAM), a Static Random Access Memory (SRAM), a Read Only Memory (ROM), a Programmable Read-Only Memory (PROM), an Electrically Erasable Programmable Read-Only Memory (EEPROM), a magnetic memory, a magnetic disk, an optical disc, and the like.

In various embodiments of the present disclosure, the storage unit 140 may store information regarding control operations for the home appliances according to the situations recognized by the control unit 130. For example, the storage unit 140 may store control information that directs the control unit 130 to turn on the home appliances managing heating or air conditioning, lighting, and TV watching upon determining that a person is present in a room. Information regarding control operations for home appliances according to situation recognition may be configured by the user or pre-configured by the manufacturer at the time of manufacture.

The storage unit 140 may store records of control operations that are applied by the control unit 130 to the home appliances according to situation recognition. The control unit 130 may send the records stored in the storage unit 140 to the portable device.

In various embodiments of the present disclosure, the remote controller 100 may further include an input unit 150 and an output unit 160.

The input unit 150 detects user input and sends an input signal corresponding to the user input to the control unit 130. The input unit 150 may include a keypad, a dome switch, a resistive or capacitive touch pad, a jog wheel, a jog switch, a finger mouse, a wheel, and the like.

The input unit 150 may be configured to include a touch sensor, a proximity sensor, an electromagnetic sensor, a pressure sensor, and the like. The input unit 150 may detect a touch input or proximity input of the user through a sensor. The input unit 150 and the output unit 160 (described below) may be combined into a layered structure, forming a touchscreen.

The control unit 130 may receive inputs for configuring and manipulating the remote controller 100 through the input unit 150.

The output unit 160 may include a voice producer, a vibration generator, and/or a display part to output information processed by the remote controller 100.

As the components of the remote controller 100 shown in FIG. 2 are nonessential, a new component may be added or an existing component may be omitted or replaced.

Figure 3:
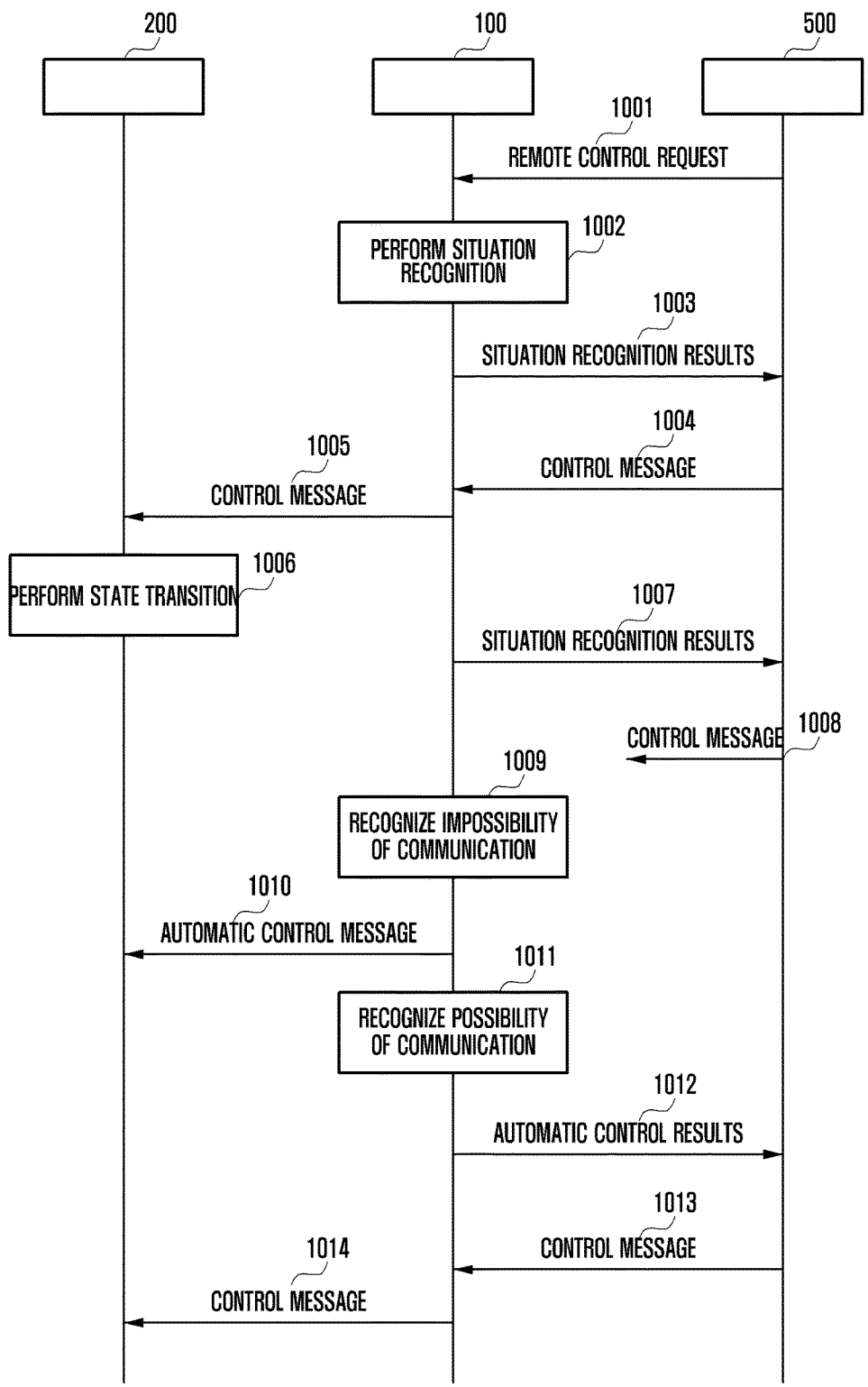
FIG. 3 is a sequence diagram of a method for remote control of home appliances according to an embodiment of the present disclosure.

FIG. 3 is a sequence diagram of a method for remote control of home appliances according to an embodiment of the present disclosure.

Referring to FIG. 3, at operation 1001, the remote controller 100 receives a remote control request from the portable device 500.

The portable device 500 may send a remote control request to the remote controller 100 in response to a user input or a request from a home appliance remote control application.

Upon reception of a remote control request, at operation 1002, the remote controller 100 performs situation recognition. Specifically, the remote controller 100 may monitor the surroundings thereof or analyze states of at least one home appliance 200.

The remote controller 100 may perform situation recognition based on information collected through the sensor unit 120. The remote controller 100 may collect information on the surroundings using at least one of the camera sensor 121, the gas sensor 122, the temperature sensor 123, the humidity sensor 124, and the motion sensor 125 included in the sensor unit 120. The remote controller 100 may be aware of the surroundings thereof or operational states of the home appliance 200 based on the collected information.

For example, when a human shape is extracted from an image captured by the camera sensor 121, the remote controller 100 may recognize that a person is present in a room in which the remote controller 100 is installed. When colors or images are detected in the TV frame of a captured image, the remote controller 100 may recognize that the TV set is turned on.

As another example, when the concentration of carbon dioxide measured by the gas sensor 122 is higher than a preset threshold, the remote controller 100 may recognize that a fire breaks out in the room. The remote controller 100 may be aware of current temperature or humidity in the room based on measurement values provided by the temperature sensor 123 or the humidity sensor 124.

At operation 1003, the remote controller 100 sends situation recognition results to the portable device 500.

Upon reception of situation recognition results, the portable device 500 may display the situation recognition results using a Graphical User Interface (GUI) feature and a remote control application, program or service for household appliances. The user may recognize current states of the home through the displayed GUI screen and decide whether to control the home appliances.

The portable device 500 may create a control message containing home appliance control information when the user generates a home appliance control input on the GUI or when the portable device 500 autonomously determines that home appliance control is necessary. The control message may contain an identifier, name and position of a home appliance to be controlled as home appliance information. The control message may further contain information on on/off control parameters, value setting parameters and motion control parameters as home appliance control information.

At operation 1004, the portable device 500 sends the created control message to the remote controller 100.

When it is necessary to directly control the home appliance 200, the portable device 500 may directly send a control message to the home appliance 200 not via the remote controller 100.

Upon reception of the control message, the remote controller 100 controls operation of the home appliance 200 indicated by the control message. At operation 1005, the remote controller 100 may forward the received control message to the corresponding home appliance 200. Alternatively, the remote controller 100 may create another control message specific to the corresponding home appliance 200 based on the received control message and send the created control message to the home appliance 200. Here, the control message may contain information on on/off control parameters, value setting parameters and motion control parameters as home appliance control information.

In various embodiments of the present disclosure, control messages may have different names and formats according to technical implementations.

Upon reception of the control message, at operation 1006, the home appliance 200 performs a state transition according to the control message. For example, the home appliance 200 performs a control operation indicated by the control message. For example, the home appliance 200 may perform a power on/off operation as indicated by the control message. The home appliance 200 may perform temperature adjustment or humidity adjustment or move to a designated position according to the control message.

The remote controller 100 continuously monitors states of the home appliances and performs situation recognition based on the monitored states. At operation 1007, the remote controller 100 may send situation recognition results to the portable device 500. The remote controller 100 may send situation recognition results to the portable device 500 on a periodic basis or on a demand basis (state change).

In a variety of situations, the portable device 500 may be unable to perform wired/wireless communication. For example, when the portable device 500 is outside the service area, it cannot communicate data with the home appliance 200 or the remote controller 100.

At operation 1008, the portable device 500 attempts to send a control message. But, the portable device 500 fails to send the control message, or the remote controller 100 or home appliance 200 fails to receive the control message.

At operation 1009, the remote controller 100 is aware that communication with the portable device 500 is not possible. Specifically, the remote controller 100 may send a control message to the portable device 500 and determine whether a corresponding response is received from the portable device 500. Here, the control message may correspond to a reference signal or control signal for examining the state of communication with the portable device 500. When a response corresponding to the control message is not received from the portable device 500, the remote controller 100 may determine that communication with the portable device 500 is not possible.

Alternatively, when a control message for controlling the home appliance 200 is not received from the portable device 500 for a preset time, the remote controller 100 may determine that communication with the portable device 500 is not possible.

Some schemes to determine impossibility of communication with the portable device 500 are illustrated above. However, the remote controller 100 may determine impossibility of communication with the portable device 500 in various other ways.

Upon determining that communication with the portable device 500 is not possible, the remote controller 100 directly controls at least one home appliance 200.

More specifically, the remote controller 100 repeatedly performs situation recognition and determines necessity of control of the home appliance 200 based on situation recognition results. For example, when the situation recognition results indicate that a person is newly present in a room in which no person was present, the remote controller 100 may determine that lighting power is to be turned on. When the situation recognition results indicate that indoor temperature is out of a suitable temperature range, the remote controller 100 may determine that the heater or air conditioner is to be controlled. When the situation recognition results indicate that the concentration of carbon dioxide is above a preset level, the remote controller 100 may determine that firefighting appliances are to be controlled.

Information regarding necessity of control of home appliances and control operations thereof may be configured by the user or by the manufacturer at the time of manufacture.

When it is necessary to control the home appliance 200, at operation 1010, the remote controller 100 may create an automatic control message containing control information and send the automatic control message to the home appliance 200 to be controlled. Here, the automatic control message may contain control information corresponding to necessity of control.

Upon reception of the automatic control message, the home appliance 200 performs a control operation indicated by the automatic control message.

The remote controller 100 may temporarily or semi-permanently store records on the automatic control operations performed.

During performance of automatic control, at operation 1011, the remote controller 100 is aware that communication with the portable device 500 is possible. Specifically, during performance of automatic control, to determine whether communication with the portable device 500 is possible, the remote controller 100 may send a specified message to the portable device 500 on a periodic basis. When a response corresponding to the message is received from the portable device 500, the remote controller 100 may determine that communication with the portable device 500 is possible.

Alternatively, when a control message for controlling the home appliance 200 is received from the portable device 500, the remote controller 100 may determine that communication with the portable device 500 is possible.

Upon determining that communication with the portable device 500 is possible, at operation 1012, the remote controller 100 sends automatic control results to the portable device 500. If the remote controller 100 maintains records on automatic control operations performed during the period of time when communication with the portable device 500 is not possible, it may send the records as a history to the portable device 500.

Thereafter, the remote controller 100 repeatedly performs situation recognition and sends situation recognition results to the portable device 500. At operation 1013, the remote controller 100 may receive a control message from the portable device 500. At operation 1014, the remote controller 100 may control the home appliance 200 according to the control message.

In the above description, the remote controller 100 is depicted as performing automatic control when communication with the portable device 500 is not possible. However, the present disclosure is not limited thereto. For example, the remote controller 100 may directly control the home appliance 200 according to situation recognition results even when communication with the portable device 500 is possible.

A description of remote control operations of the remote controller 100 is provided below.

Figure 4:
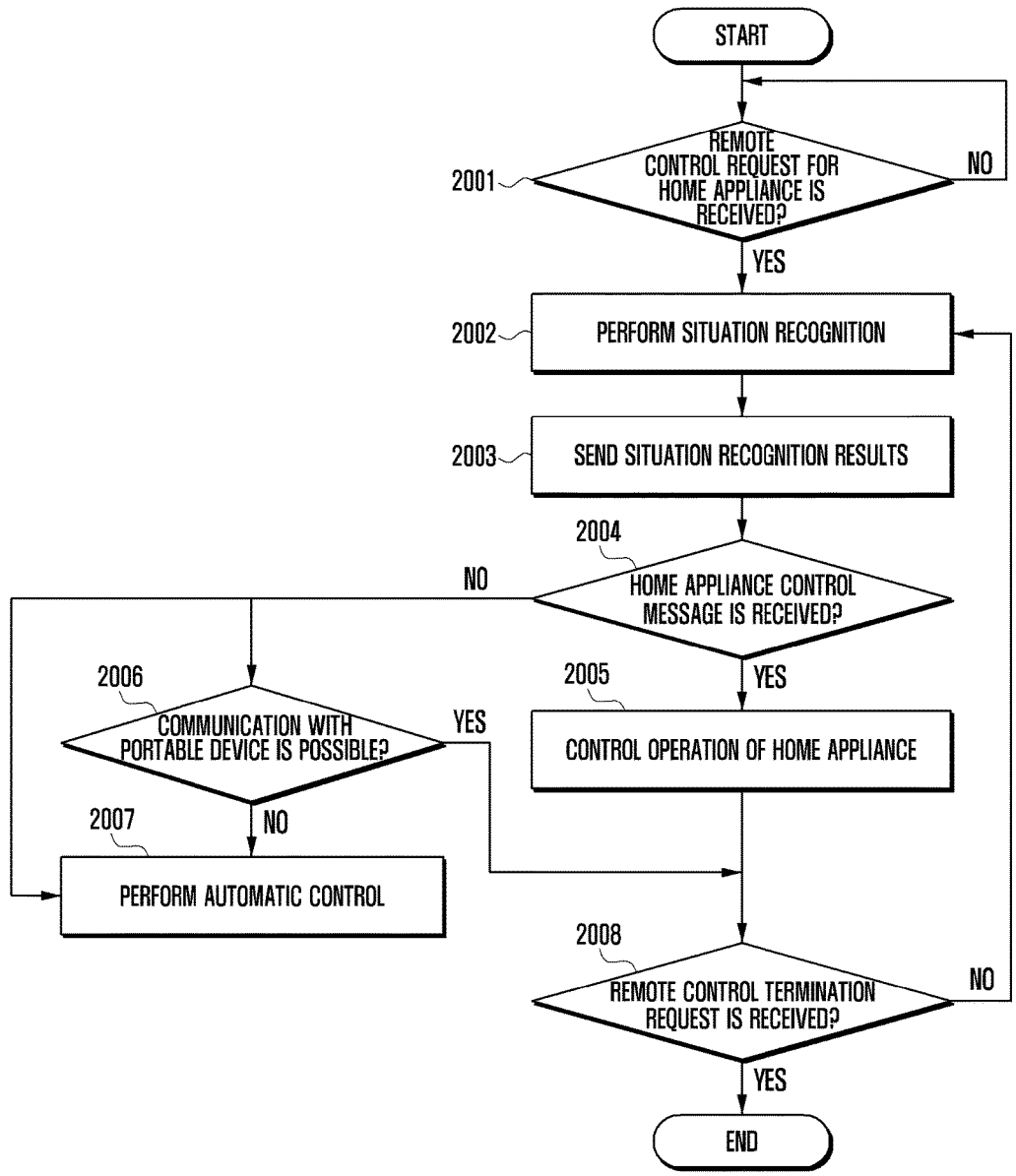
FIG. 4 is a flowchart illustrating operations of a remote controller according to an embodiment of the present disclosure.

FIG. 4 is a flowchart illustrating operations of a remote controller according to an embodiment of the present disclosure.

Referring to FIG. 1, at operation 2001, the control unit 130 of the remote controller 100 determines whether a remote control request for a home appliance is received.

The control unit 130 may determine whether a remote control request is received through the communication unit 110 from the portable device 500. The portable device 500 may send a remote control request to the remote controller 100 in response to user input or a request from a home appliance remote control application.

If it is determined at operation 2001 that a remote control request is received, the procedure proceeds to operation 2002 at which the control unit 130 performs situation recognition.

Specifically, the control unit 130 may monitor the surroundings of the remote controller 100 or analyze states of at least one home appliance 200.

In various embodiments of the present disclosure, the control unit 130 may perform situation recognition based on information collected through the sensor unit 120. The control unit 130 may collect information on the surroundings using at least one of the camera sensor 121, the gas sensor 122, the temperature sensor 123, the humidity sensor 124, and the motion sensor 125 included in the sensor unit 120. The control unit 130 may be aware of the surroundings of the remote controller 100 or operational states of the home appliance 200 based on the collected information.

For example, when a human shape is extracted from an image captured by the camera sensor 121, the control unit 130 may recognize that a person is present in a room in which the remote controller 100 is installed. When colors or images are detected in the TV frame of a captured image, the control unit 130 may recognize that the TV set is turned on.

As another example, when the concentration of carbon dioxide measured by the gas sensor 122 is above a preset threshold, the control unit 130 may recognize that a fire breaks out in the room. The control unit 130 may be aware of current temperature or humidity in the room based on measurement values provided by the temperature sensor 123 or the humidity sensor 124.

After situation recognition, at operation 2003, the control unit 130 sends situation recognition results to the portable device 500.

The control unit 130 may control the communication unit 110 to send situation recognition results to the portable device 500. The portable device 500 notifies the user of the situation recognition results, and the user may use the portable device 500 to control the home appliance 200 if necessary.

Thereafter, at operation 2004, the control unit 130 determines whether a home appliance control message is received.

Here, the home appliance control message may be a message sent by the portable device 500 having received situation recognition results. A home appliance control message may be generated by an application, program or service supporting the remote control function of the portable device 500. The home appliance control message may contain an identifier, name and position of a home appliance to be controlled as home appliance information. The home appliance control message may further contain information on on/off control parameters, value setting parameters and motion control parameters as home appliance control information.

If it is determined at operation 2004 that a home appliance control message is received, the procedure proceeds to operation 2005 at which the control unit 130 controls operation of the home appliance 200 indicated by the message.

For example, the control unit 130 may forward the received home appliance control message to the corresponding home appliance 200. Alternatively, the control unit 130 may create another control message specific to the corresponding home appliance 200 based on the received home appliance control message and send the created control message to the home appliance 200. Here, the control message may contain information on on/off control parameters, value setting parameters and motion control parameters as home appliance control information.

If it is determined at operation 2004 that a home appliance control message is not received, the procedure proceeds to operation 2006 at which the control unit 130 determines whether communication with the portable device 500 is possible.

In a variety of situations, the portable device 500 may be unable to perform wired/wireless communication. For example, when the portable device 500 is outside the service area, it cannot communicate data with the home appliance 200 or the remote controller 100.

In this case, the portable device 500 may fail to send a created home appliance control message, or although the portable device 500 may send a home appliance control message, the remote controller 100 or home appliance 200 may fail to receive the home appliance control message.

The control unit 130 may determine possibility of communication with the portable device 500 as follows. The control unit 130 may send a control message to the portable device 500 and determine whether a corresponding response is received from the portable device 500. Here, the control message may correspond to a reference signal or control signal for examining the state of communication with the portable device 500. When a response corresponding to the control message is not received from the portable device 500, the control unit 130 may determine that communication with the portable device 500 is not possible.

Alternatively, when a home appliance control message is not received from the portable device 500 for a preset time, the control unit 130 may determine that communication with the portable device 500 is not possible.

If it is determined at operation 2006 that communication with the portable device 500 is not possible, the procedure proceeds to operation 2007 at which the control unit 130 performs automatic control.

Specifically, the control unit 130 repeatedly performs situation recognition and determines necessity of control of the home appliance 200 based on situation recognition results. For example, when the situation recognition results indicate that a person is newly present in a room in which no person was present, the control unit 130 may determine that lighting power is to be turned on. When the situation recognition results indicate that indoor temperature is out of a suitable temperature range, the control unit 130 may determine that the heater or air conditioner is to be controlled. When the situation recognition results indicate that the concentration of carbon dioxide is above a preset level, the control unit 130 may determine that firefighting appliances are to be controlled.

Information regarding necessity of control of home appliances and control operations thereof may be configured by the user or by the manufacturer at the time of manufacture and be stored in the storage unit 140.

When it is necessary to control the home appliance 200, the control unit 130 may create an automatic control message containing control information and send the automatic control message to the home appliance 200 to be controlled. Here, the automatic control message may contain control information corresponding to necessity of control.

Upon reception of the automatic control message, the home appliance 200 performs a control operation indicated by the automatic control message.

In one embodiment, the control unit 130 may temporarily or semi-permanently store records on the automatic control operations performed in the storage unit 140 as a history of automatic control.

During performance of automatic control, the control unit 130 may repeatedly determine whether communication with the portable device 500 is possible.

Specifically, during performance of automatic control, to determine possibility of communication with the portable device 500, the control unit 130 may send a specified message to the portable device 500 on a periodic basis. When a response corresponding to the message is received from the portable device 500 at some point in time, the control unit 130 may determine that communication with the portable device 500 is possible.

Alternatively, when a home appliance control message is received from the portable device 500 at some point in time, the control unit 130 may determine that communication with the portable device 500 is possible.

Upon determining that communication with the portable device 500 is possible, the control unit 130 may control the home appliance 200 according to directions of the portable device 500. If automatic control operations are performed for the home appliance 200 during the period of time when communication with the portable device 500 is not possible, the control unit 130 may send records on the automatic control operations performed as a history to the portable device 500.

On the other hand, if it is determined at operation 2006 that communication with the portable device 500 is possible, the procedure proceeds to operation 2008. During control of the home appliance 200 according to directions of the portable device 500, at operation 2008, the control unit 130 determines whether a remote control termination request is received.

If it is determined at operation 2008 that a remote control termination request is received, the control unit 130 ends the procedure for home appliance remote control. On the other hand, if it is determined at operation 2008 that a remote control termination request is not received, the control unit 130 returns to operation 2002 and continues situation recognition and home appliance control.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling by an apparatus for at least one of devices, the method comprising:
    detecting an environment state of the at least one of devices;
    transmitting a message comprising a detecting result to a portable device which controls the at least one of the devices;
    transmitting, if a control message for controlling the at least one of the devices is received from the portable device, the received control message to the at least one of the devices;
    determining a communicating state of the portable device is disabled, if the control message is not received during a predetermined time; and
    transmitting an automatic control message for controlling the at least one of the devices to the at least one of the devices, if the communicating state of the portable device is determined to be disabled and the detecting result corresponds to a predetermined event,
    wherein the environment state is a result detected using at least one sensor within a distance from the at least one of the devices.

2. The method of claim 1, wherein the detecting of the environment state comprises monitoring at least one of operational states of the at least one of devices and the surroundings of the apparatus.

3. The method of claim 1, wherein the detecting of the environment state comprises detecting of the environment state based on information collected through at least one of a camera sensor, a gas sensor, a temperature sensor, a humidity sensor, and a motion sensor.

4. The method of claim 1, further comprising:
    transmitting a signal to the portable device;
    determining the communicating state of the portable device is disabled, if a response corresponding to the signal is not received; and
    transmitting the automatic control message to the at least one of the devices, if the communicating state of the portable device is disabled.

5. The method of claim 4, wherein the determining of the communicating state comprises determining that the communicating state is disabled if no message is received from the portable device for a preset time.

6. The method of claim 1, wherein the transmitting of the control message to the at least one of the devices, if the control message is received from the portable device, further comprises:
    receiving the control message for controlling the at least one of the devices from the portable device; and
    transmitting the control message to the at least one of the devices according to the received control message.

7. The method of claim 6, wherein the control message comprises at least one of an identifier, name and position of a device to be controlled as device information, information on on/off control parameters, value setting parameters, and motion control parameters.

8. An apparatus for controlling devices, the apparatus comprising:
    a communication device configured to communicate with at least one of the devices and a portable device capable of controlling the at least one of the devices;
    a sensor device configured to detect an environment state of the at least one of the devices; and
    a processor configured to:
        detect an environment state of the at least one of the devices,
        control the communication device for transmitting a message comprising a detecting result to a portable device which controls the at least one of the devices,
        transmit, if a control message for controlling the at least one of the devices is received from the portable device, the received control message to the at least one of the devices,
        determine a communicating state of the portable device is disabled, if the control message is not received during a predetermined time, and
        transmit an automatic control message for controlling the at least one of the devices to the at least one of the devices, if the communicating state of the portable device is determined to be disabled and the detecting result corresponds to a predetermined event,
    wherein the environment state is a result detected using at least one sensor within a distance from the at least one of the devices.

9. The apparatus of claim 8, wherein the processor is further configured to detect at least one of operational states of the at least one of the devices and the surroundings of the apparatus based on information detected through the sensor device.

10. The apparatus of claim 8, wherein the sensor device comprises at least one of a camera sensor, a gas sensor, a temperature sensor, a humidity sensor, and a motion sensor.

11. The method of claim 1, wherein the predetermined event comprises at least one of detecting a user, detecting an absence of the user, detecting that a temperature is out of a preset temperature range, or detecting that a concentration of carbon dioxide is above a preset level.

12. The apparatus of claim 8, wherein the predetermined event comprises at least one of detecting a user, detecting an absence of the user, detecting that a temperature is out of a preset temperature range, or detecting that a concentration of carbon dioxide is above a preset level.

13. The apparatus of claim 8, wherein the processor is further configured to:
    control the communication device to transmit a signal to the portable device,
    determine the communicating state of the portable device is disabled, if a response corresponding to the signal is not received, and
    control the communication device to transmit the automatic control message to the at least one of the devices, if the communicating state of the portable device is disabled.

14. The apparatus of claim 13, wherein the processor is further configured to determine that the communicating state is disabled if no message is received from the portable device for a preset time.

15. The apparatus of claim 8, wherein the processor is further configured to control the communication device to:

receive the control message to control the at least one of the devices from the portable device, and transmit the control message to the at least one of the devices according to the received control message.

16. The apparatus of claim 15, wherein the control message comprises at least one of an identifier, name and position of a device to be controlled as device information, information on on/off control parameters, value setting parameters, and motion control parameters.

* * * * *